(12) United States Patent
Nagashima et al.

(10) Patent No.: US 12,070,791 B1
(45) Date of Patent: Aug. 27, 2024

(54) MANUFACTURING METHOD FOR FASTENING STRUCTURE

(71) Applicant: TOYOTA JIDOSHA KABUSHIKI KAISHA, Toyota (JP)

(72) Inventors: Shinya Nagashima, Kariya (JP);
Toshiyuki Dobashi, Nagoya (JP);
Nobuyuki Shinohara, Tajimi (JP);
Mayumi Nakanishi, Okazaki (JP);
Reona Takagishi, Tajimi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/401,849

(22) Filed: Jan. 2, 2024

(30) Foreign Application Priority Data

Mar. 16, 2023 (JP) ................................ 2023-042410

(51) Int. Cl.
*B21J 15/02* (2006.01)
*B21J 15/36* (2006.01)
*F16B 19/08* (2006.01)

(52) U.S. Cl.
CPC .............. *B21J 15/025* (2013.01); *B21J 15/36* (2013.01); *F16B 19/086* (2013.01)

(58) Field of Classification Search
CPC ................................ B21J 15/025; B21J 15/36
See application file for complete search history.

(56) References Cited

FOREIGN PATENT DOCUMENTS

| JP | H08117017 A | * | 5/1996 |
| JP | 2010-188383 A | | 9/2010 |

* cited by examiner

*Primary Examiner* — Jason L Vaughan
*Assistant Examiner* — Amanda Kreiling
(74) *Attorney, Agent, or Firm* — SoraIP, Inc.

(57) ABSTRACT

A thickened part is formed in the first member. The thickened part has a protruded part that is convex on one side in the thickness direction of the first member, so that the thick portion is set thicker than the general portion as the other portion. At least a part of the second member overlaps a part of the first member that includes the thickened part from another side of the first member in the plate thickness direction, and the self-piercing rivet is driven into a fastening overlapped part that is a part that the second member overlaps the thickened part from a second member side, so as to fasten the first member and the second member.

4 Claims, 3 Drawing Sheets

MANUFACTURING METHOD FOR FASTENING STRUCTURE

CROSS-REFERENCE TO RELATED APPLICATION

This application claims priority to Japanese Patent Application No. 2023-042410 filed on Mar. 16, 2023 incorporated herein by reference in its entirety.

BACKGROUND

1. Technical Field

The present disclosure relates to a manufacturing method for a fastening structure.

2. Description of Related Art

Japanese Unexamined Patent Application Publication No. 2010-188383 (JP 2010-188383 A) discloses a technique for joining (fastening) a pair of joined plate materials that overlaps each other by using a self-piercing rivet. To briefly explain the prior art, the self-piercing rivet is used to join the joined plate materials by boring a hole in the joined plate materials by using a hollow leg part.

SUMMARY

By the way, in such a technique, it is required to suppress a crack of a lower plate member caused by driving of the self-piercing rivet.

In consideration of the above facts, an object of the present disclosure is to obtain a manufacturing method for a fastening structure that is able to suppress a crack of a lower plate member that is caused by driving of a self-piercing rivet.

The manufacturing method for a fastening structure of the present disclosure according to claim 1 is a manufacturing method for a fastening structure that fastens a first member with a plate shape and a second member with a plate shape using a self-piercing rivet. The first member is provided with a thickened part that a plate thickness is set to be thicker than a plate thickness of another part by including a protruded part that is protruded on one side in a plate thickness direction. At least a part of the second member overlaps a part of the first member that includes the thickened part from another side of the first member in the plate thickness direction, and the self-piercing rivet is driven into a fastening overlapped part that is a part that the second member overlaps the thickened part from a second member side, so as to fasten the first member and the second member.

According to the above structure, the first member is provided with a thickened part that a plate thickness is set to be thicker than a plate thickness of another part by including a protruded part that is protruded on one side in a plate thickness direction. According to the above structure, at least a part of the second member overlaps a part of the first member that includes the thickened part from another side of the first member in the plate thickness direction. Next, the self-piercing rivet is driven into a fastening overlapped part that is a part that the second member overlaps the thickened part from the second member side. Further, the first member and the second member are fastened. Therefore, in a state that the self-piercing rivet is driven into the first member and the second member, the thickness of the part of the first member that covers the tip side of the self-piercing rivet is able to be made thicker, compared to a comparative example in which the thickened part was not present. Therefore, it is possible to suppress a crack on the first member side caused by driving of the self-piercing rivet.

In the manufacturing method for a fastening structure of the present disclosure according to claim 2, in the structure according to claim 1, the thickened part is heated from a top surface side of the protruded part, before a step of driving the self-piercing rivet into the fastening overlapped part.

According to the above structure, the thickened part is heated from a top surface side of the protruded part, before a step of driving the self-piercing rivet into the fastening overlapped part. Therefore, the self-piercing rivet is driven into the thickened part, especially the protruded part, in a state that the ductility is higher than the ductility at the normal temperature. Therefore, a crack of the first member is suppressed.

In the manufacturing method for a fastening structure of the present disclosure according to claim 3, in the structure according to claim 1 or 2, a part of the first member that overlaps the second member is heated from a support member that supports the first member from a side opposite to a side on which the self-piercing rivet is to be driven into the fastening overlapped part, when driving the self-piercing rivet into the fastening overlapped part.

According to the above structure, a part of the first member that overlaps the second member is warmed by heating from the support member, when driving the self-piercing rivet into the fastening overlapped part. Therefore, when the self-piercing rivet is driven, the part of the first member that overlaps the second member will be in a state that the ductility is higher than the ductility at the normal temperature. Therefore, a crack of the first member is suppressed. Further, the first member is heated from the support member. Therefore, it becomes possible to efficiently perform heating to suppress a crack of the first member.

In the manufacturing method for a fastening structure of the present disclosure according to claim 4, in the structure according to claim 3, the support member is provided with a thickness corresponding recessed part that comes into contact with a deformed part of the thickened part when the thickened part is deformed by driving the self-piercing rivet into the fastening overlapped part, and the first member is heated from the thickness corresponding recessed part when driving the self-piercing rivet into the fastening overlapped part.

According to the above structure, the thickened part deforms when the self-piercing rivet is driven into the fastening overlapped part. The deformed part comes into contact with the thickness corresponding recessed part and is heated. Therefore, when the self-piercing rivet is driven, it is possible to effectively increase the ductility of the deformed part of the first member below the tip of the self-piercing rivet, that is, the part in which a crack is likely to occur. Therefore, a crack of the first member is effectively suppressed.

As explained above, according to the manufacturing method for a fastening structure of the present disclosure, a crack of the first member (lower plate member) caused by driving of the self-piercing rivet is able to be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A manufacturing method for a fastening structure according to an embodiment of the present disclosure will be described with reference to FIGS. 1 to 3.

Figure 1:
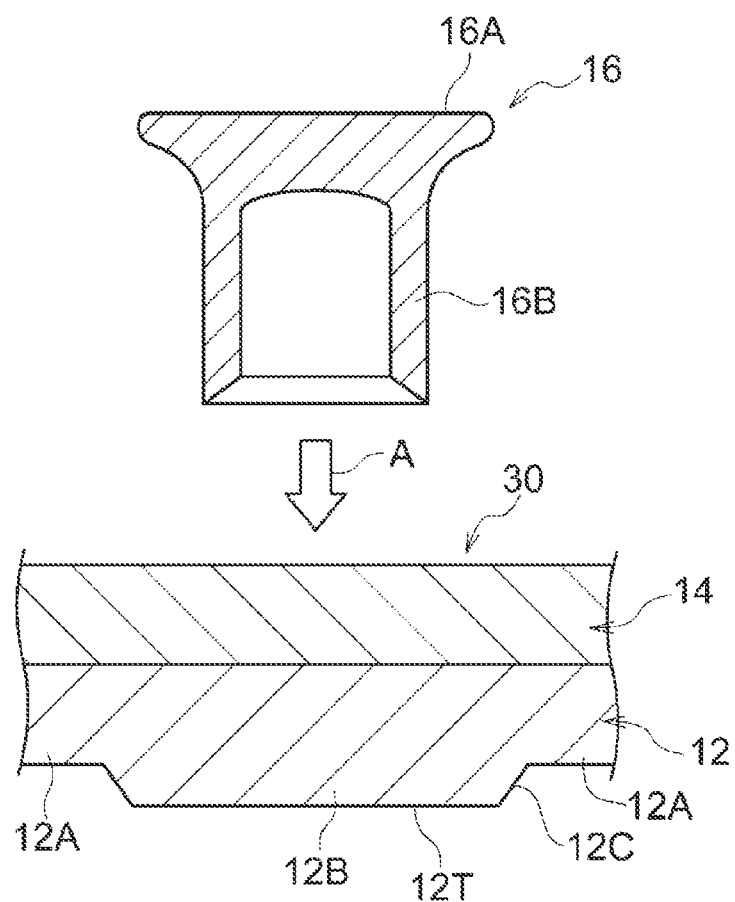
FIG. 1 is a cross-sectional view showing a first member, a second member, and a self-piercing rivet used in a manufacturing method for a fastening structure according to an embodiment.
Figure 2:
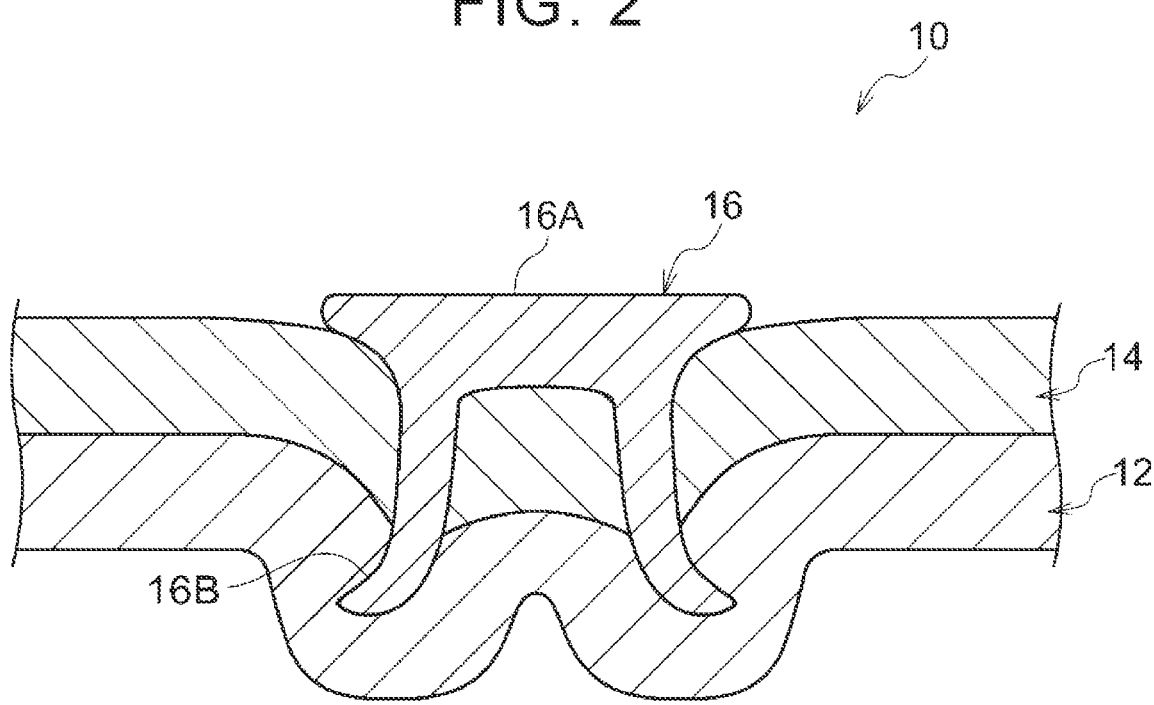
FIG. 2 is a sectional view showing a state in which the first member and the second member are fastened with the self-piercing rivet of FIG. 1.

FIG. 1 shows a cross-sectional view of a first member 12, a second member 14, and a self-piercing rivet 16 used in the manufacturing method for a fastening structure according to this embodiment. The manufacturing method for a fastening structure according to the present embodiment includes fastening a plate-shaped first member 12 and a plate-shaped second member 14 using self-piercing rivets 16 to produce a fastening structure 10 shown in FIG. 2. It's a method.

The first member 12 and the second member 14 shown in FIG. 1 are both made of metal. More specifically, the first member 12 is made of die-cast aluminum, for example. The second member 14 is made of steel, for example. The first member 12 and the second member 14 are, for example, panels for a vehicle. The first member 12 is formed with a thickened part 12B. The thickened part 12B has a protruded part 12C that is convex on one side in the thickness direction of the first member 12, so that the thickened part 12B is set thicker than the general portion 12A as the other portion.

The protruded part 12C is, for example, formed in a truncated cone shape. Further, the amount of protrusion of the protruded part 12C is set to be smaller than the thickness of the general portion 12A, for example. Further, the top surface 12T, which is the tip surface in the protruding direction of the protruded part 12C, is, for example, the same (same level) size as the head 16A of the self-piercing rivet 16 in plan view when viewed in the thickness direction of the first member 12.

The self-piercing rivet 16 is made of special steel such as chromium molybdenum steel. The self-piercing rivet 16 includes a head 16A and a cylindrical leg part 16B extending from the head 16A. In the self-piercing rivet 16, the inner diameter of the leg part 16B on the distal end side is gradually enlarged toward the distal end in order to facilitate deformation of the distal end side of the leg part 16B in the direction of expanding the diameter when driving into a member. Note that in FIG. 1, arrow A indicates the direction in which the self-piercing rivet 16 is driven into the second member 14 and the first member 12.

Next, with reference to FIG. 3, an example of a fastening device used in the method of manufacturing the fastening structure 10 (see FIG. 2) will be described.

Figure 3:
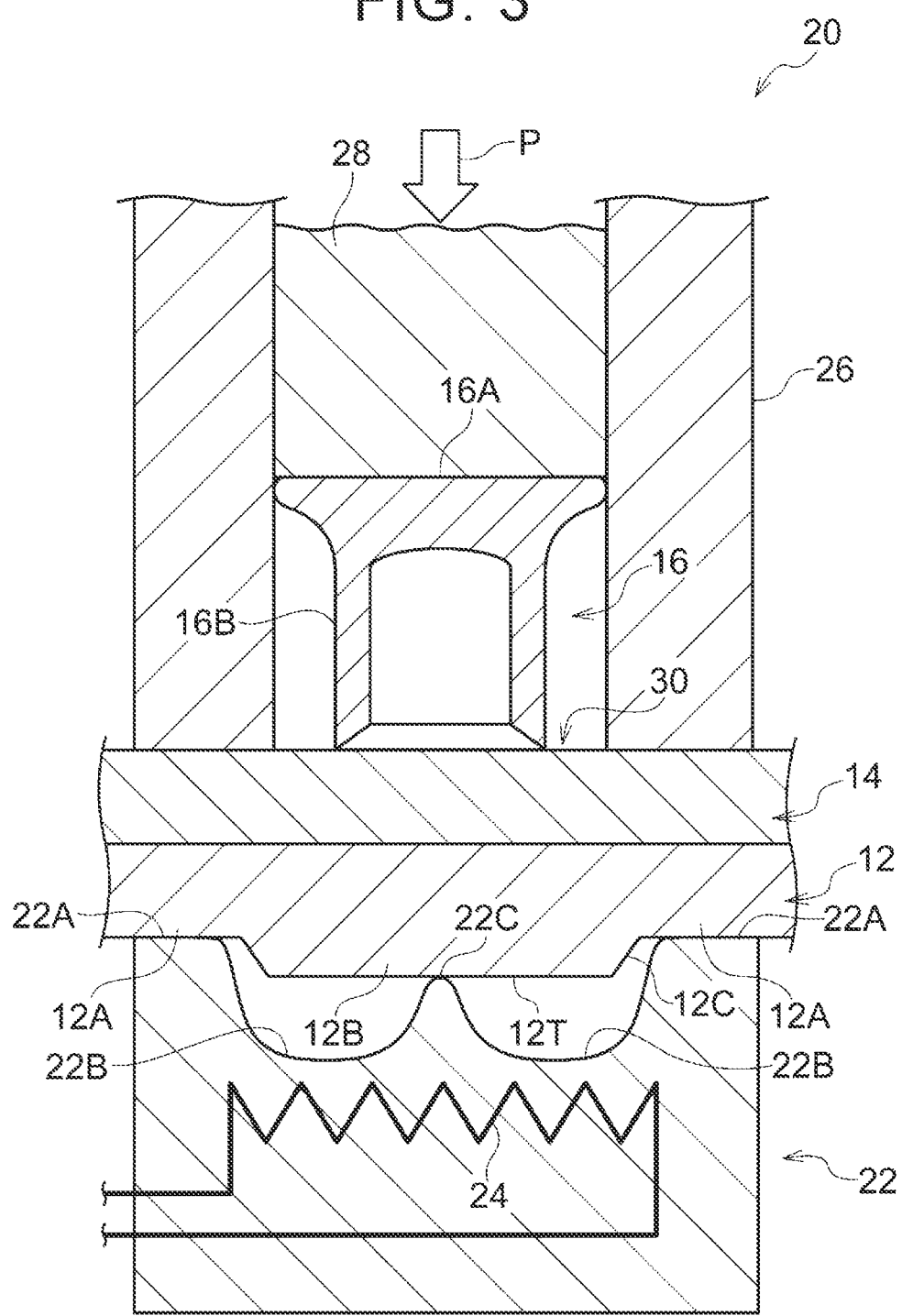
FIG. 3 is a sectional view showing an example of a fastening device used in the manufacturing method for a fastening structure according to an embodiment, together with a first member, a second member, and a self-piercing rivet.

As shown in FIG. 3, the fastening device 20 includes a die 22 as a support member that supports the first member 12 from the side opposite to the driving side of the self-piercing rivet 16. The die 22 is made of, for example, steel. The die 22 has a general support surface 22A that supports the general portion 12A of the first member 12 from below. The die 22 is formed with a thickness corresponding recessed part 22B. The thickness corresponding recessed part 22B comes into contact with the deformed portion when the thickened part 12B is deformed by driving the self-piercing rivet 16. The thickness corresponding recessed part 22B is recessed with respect to the general support surface 22A. The thickness corresponding recessed part 22B is formed in an annular shape when viewed from above. Furthermore, the die 22 has a thickness central support part 22C that supports the central portion of the thickened part 12B of the first member 12 from below.

Furthermore, the die 22 has a built-in heater 24. The heater 24 is provided, for example, at a position corresponding to the thickness corresponding recessed part 22B and the thickness central support part 22C. Note that the heater 24 is shown schematically in the figure. The heater 24 may be arranged along the thickness corresponding recessed part 22B and the thickness central support part 22C. The heater 24 is connected to a power source (not shown), and can raise its temperature by being energized. The heater 24 is configured to be energized by a user's operation or by automatic control.

The fastening device 20 also includes a cylinder 26 and a punch 28. Cylinder 26 is formed into a cylindrical shape. The self-piercing rivet 16 can be inserted into the cylinder 26. Moreover, the cylinder 26 is arranged so as to correspond to the outer peripheral side of the thickness corresponding recessed part 22B. The first member 12 and the second member 14 supported by the die 22 are pressed against the die 22 side. The punch 28 is a cylindrical member. The punch 28 is movable in the axial direction within the cylinder 26 by a drive device (not shown). The punch 28 is configured to be able to press the self-piercing rivet 16 inserted into the cylinder 26 from above. In addition, in the figure, the direction in which the punch 28 presses the self-piercing rivet 16 is indicated by an arrow P.

Next, a manufacturing method for a fastening structure using the fastening device 20 will be explained.

First, as shown in FIG. 3, the general portion 12A of the first member 12 is supported by the general support surface 22A of the die 22. The protruded part 12C of the first member 12 is arranged on the opposite side of the thickness corresponding recessed part 22B of the die 22. In this state, the center portion of the top surface 12T of the protruded part 12C of the first member 12 is supported by the thickness central support part 22C of the die 22. Further, the second member 14 is superimposed on the portion of the first member 12 including the thickened part 12B. Next, the first member 12 and the second member 14 are sandwiched between the lower end surface of the cylinder 26 and the general support surface 22A of the die 22.

Next, the die 22 is heated by energizing the heater 24 and causing the heater 24 to generate heat. Note that the timing for starting energization of the heater 24 may be before the first member 12 and the second member 14 are sandwiched between the lower end surface of the cylinder 26 and the general support surface 22A of the die 22. Next, the self-piercing rivet 16 inside the cylinder 26 is pressed from above with the punch 28.

This causes the self-piercing rivet 16 to descend. Then, the leg part 16B of the self-piercing rivet 16 penetrates the second member 14. Then, the first member 12 pressed by the self-piercing rivet 16 and the second member 14 deforms toward the thickness corresponding recessed part 22B. Thereafter, the portion of the first member 12 that was the protruded part 12C reaches the thickness corresponding recessed part 22B. Then, the first member 12 deforms along the thickness corresponding recessed part 22B. The distal end side of the leg part 16B of the self-piercing rivet 16 bites into the first member 12 while expanding its diameter. As a result, the fastening structure 10 shown in FIG. 2 is manufactured.

To summarize the above, in the manufacturing method for a fastening structure of the present embodiment, at least a portion of the second member 14 overlaps the portion including the thickened part 12B of the first member 12 shown in FIG. 3 from the upper side of the first member 12 (the other side in the plate thickness direction). A self-piercing rivet 16 is driven into the fastening overlapped part 30, which is a portion where the thickened part 12B and the second member 14 overlap, from the second member 14 side. Then, the first member 12 and the second member 14 are fastened. Therefore, compared to the comparative example in which the thickened part 12B (see FIG. 3) did not exist, in a state that the self-piercing rivet 16 is driven into the first member 12 and the second member 14 as shown in FIG. 2, the thickness of the portion of the first member 12 that covers the distal end side of the leg part 16B of the self-piercing rivet 16 can be increased. Therefore, it is possible to suppress cracks on the first member 12 side caused by driving the self-piercing rivet 16.

Further, in this embodiment, when driving the self-piercing rivet 16 shown in FIG. 3 into the fastening overlapped part 30, the portion of the first member 12 that overlaps with the second member 14 is heated by the die 22. Therefore, when the self-piercing rivet 16 is driven, the portion of the first member 12 that overlaps with the second member 14 has higher ductility than at room temperature. Therefore, cracking of the first member 12 is suppressed. Additionally, the first member 12 is heated from the die 22. Therefore, it becomes possible to efficiently heat the first member 12 to suppress cracking.

To explain heating in more detail, when driving the self-piercing rivet 16 into the fastening overlapped part 30, the first member 12 is heated from the thickness central support part 22C and the thickness corresponding recessed part 22B.

Here, in the thickness central support part 22C, the thickened part 12B is heated from the top surface 12T side of the protruded part 12C before the step of driving the self-piercing rivet 16 into the fastening overlapped part 30. Therefore, the self-piercing rivet 16 is driven into the thickened part 12B, particularly the protruded part 12C, in a state where the ductility is higher than that at room temperature, which can contribute to suppressing cracks in the first member 12.

Furthermore, when the self-piercing rivet 16 is driven, the heating from the thickness corresponding recessed part 22B to the first member 12 causes the deformed part of the first member 12 lower than the tip of the leg part 16B of the self-piercing rivet 16 to be effectively warmed up. In other words, areas that are prone to cracking can be effectively heated. The ductility of the part can be effectively increased. Therefore, cracking of the first member 12 is effectively suppressed.

As explained above, according to the manufacturing method for a fastening structure of this embodiment, it is possible to suppress cracking of the first member 12 caused by driving the self-piercing rivet 16.

In the above embodiment, the portion of the first member 12 that overlaps with the second member 14 is heated from the die 22 that includes the heater 24. However, as a modification of the above embodiment, before the step of driving the self-piercing rivet (16) into the fastening overlapped part (30), the thickened part (12B) is attached to the top surface (12T) side of the protruded part (12C). A form of heating directly from the source may also be adopted. In this direct heating, for example, an iron, a heating iron, etc. are used. In such a modification, the self-piercing rivet (16) is driven into the thickened part (12B), particularly the protruded part (12C), in a state where the ductility is higher than at room temperature. Therefore, cracking of the first member (12) is suppressed. In addition, as another modification, the fastening overlapped part (30) may be heated directly or indirectly via the die (22) by hot air from a hot air blower (dryer).

In addition, as a modification of the above embodiment, the self-piercing rivet (16) is driven into the fastening overlapped part (30) without heating the portion of the first member (12) that overlaps with the second member (14). The form can also be taken.

Further, as a modification of the above embodiment, a configuration may be adopted in which a heater (24) is provided near the general support surface (22A) of the die (22). In this form, the portion of the first member (12) that overlaps with the second member (14) is heated from the general support surface (22A) of the die (22), and the self-piercing rivet (16) is heated at the fastening overlapped part (30).

In addition, as a modification of the above embodiment, a form in which the first member (12) is supported by a support member that does not include the thickness central support part (22C) and the self-piercing rivet (16) is driven into the fastening overlapped part (30) may also be taken.

The above-mentioned embodiments and the above-mentioned modified examples can be appropriately combined and implemented.

An example of the present disclosure has been described above. However, the present disclosure is not limited to the above. It goes without saying that the present disclosure can be modified in various ways other than those described above without departing from the spirit thereof.

What is claimed is:

1. A manufacturing method for a fastening structure that fastens a first member with a plate shape and a second member with a plate shape using a self-piercing rivet, wherein:

the first member is provided with a thickened part that a plate thickness is set to be thicker than a plate thickness of another part by including a protruded part that is protruded on one side in a plate thickness direction; and at least a part of the second member overlaps a part of the first member that includes the thickened part from another side of the first member in the plate thickness direction, and the self-piercing rivet is driven into a fastening overlapped part that is a part that the second member overlaps the thickened part from a second member side, so as to fasten the first member and the second member.

2. The manufacturing method for a fastening structure according to claim 1, wherein the thickened part is heated from a top surface side of the protruded part, before a step of driving the self-piercing rivet into the fastening overlapped part.

3. The manufacturing method for a fastening structure according to claim 1, wherein a part of the first member that overlaps the second member is heated from a support member that supports the first member from a side opposite to a side on which the self-piercing rivet is to be driven into the fastening overlapped part, when driving the self-piercing rivet into the fastening overlapped part.

4. The manufacturing method for a fastening structure according to claim 3, wherein:
- the support member is provided with a thickness corresponding recessed part that comes into contact with a deformed part of the thickened part when the thickened part is deformed by driving the self-piercing rivet into the fastening overlapped part; and
- the first member is heated from the thickness corresponding recessed part when driving the self-piercing rivet into the fastening overlapped part.

* * * * *